(12) United States Patent
Bobba et al.

(10) Patent No.: US 6,976,235 B2
(45) Date of Patent: Dec. 13, 2005

(54) REGION-BASED VOLTAGE DROP BUDGETS FOR LOW-POWER DESIGN

(75) Inventors: Sudhakar Bobba, Sunnyvale, CA (US); Gin Yee, Sunnyvale, CA (US); Pradeep Trivedi, Sunnyvale, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 113 days.

(21) Appl. No.: 10/246,089

(22) Filed: Sep. 18, 2002

(65) Prior Publication Data

US 2004/0054979 A1 Mar. 18, 2004

(51) Int. Cl.[7] ............................ G06F 9/45; G06F 17/50
(52) U.S. Cl. ....................... 716/7; 716/4; 716/5; 716/8; 716/12
(58) Field of Search ............................... 716/1–2, 4–15

(56) References Cited

U.S. PATENT DOCUMENTS

| 4,924,430 | A | * | 5/1990 | Zasio et al. ................... 716/6 |
| 6,028,440 | A | * | 2/2000 | Roethig et al. ............. 324/765 |
| 6,118,334 | A | * | 9/2000 | Tanaka et al. ............... 327/565 |
| 6,249,898 | B1 | * | 6/2001 | Koh et al. ...................... 716/4 |
| 6,480,989 | B2 | * | 11/2002 | Chan et al. ..................... 716/8 |
| 6,523,150 | B1 | * | 2/2003 | Buffet et al. ................... 716/4 |
| 6,665,843 | B2 | * | 12/2003 | Frech et al. .................... 716/4 |
| 6,675,139 | B1 | * | 1/2004 | Jetton et al. .................. 703/17 |
| 2004/0031008 | A1 | * | 2/2004 | Satoh et al. .................... 716/8 |

OTHER PUBLICATIONS

G. Bai et al., "Simulation and Optimization of the Power Distribution Network in VLSI Circuits," 2000 IEEE/ACM Int'l Conference on CAD, pp. 481-486.*

* cited by examiner

*Primary Examiner*—Leigh M. Garbowski
(74) *Attorney, Agent, or Firm*—Osha Liang LLP

(57) ABSTRACT

A method and apparatus for assigning a set of region-based voltage drop budgets to an integrated circuit is provided. Further, a method for partitioning an integrated circuit into optimal voltage drop regions includes analyzing the integrated circuit for worst-case voltage drop data. The worst-case voltage drop data is used to partition the integrated circuit into a set of voltage drop regions, wherein each voltage drop region is assigned a region-based voltage drop budget. The region-based voltage drop budget assigned to a particular voltage drop region is based on a worst-case voltage drop experienced by that voltage drop region.

10 Claims, 6 Drawing Sheets

REGION-BASED VOLTAGE DROP BUDGETS FOR LOW-POWER DESIGN

BACKGROUND OF THE INVENTION

A typical computer system includes at least a microprocessor and some form of memory. The microprocessor has, among other components, arithmetic, logic, and control circuitry that interpret and execute instructions necessary for the operation and use of the computer system.

At the center of modern computer systems are very large scale integrated circuits, often including millions of logic circuits within a very small area. The design of these integrated circuits is a difficult and time-consuming task. As a result, circuit simulations, i.e., preliminary circuit models used to predict/measure chip behavior and performance, have proven to be valuable and often necessary tools for reducing the design time required to synthesize integrated circuits. Further, circuit simulations may be used to improve circuit design and guarantee functional correctness of the circuit. Thus, the development of accurate circuit simulation techniques is essential for a designer to keep pace with the ever-increasing complexity of an integrated circuit.

FIG. 1 shows a circuit simulation process used by a typical circuit simulation tool, e.g., a computer system. In FIG. 1, the circuit simulation process is broken down into three steps: system design analysis (12), logic design analysis (14), and circuit design analysis (16). First, a design specification (10), i.e., a system overview of an integrated circuit design, is used to perform the system design analysis (12) of the integrated circuit (IC). The system design analysis (12) breaks the design specification (10) into subsystems and specifies the characteristics of each subsystem. For example, a system design analysis may specify the number and types of memory devices, arithmetic devices, and input/output devices as well as the interconnection and control of these subsystems.

Next, the logic design analysis (14) is used to produce a more detailed description of the IC's subsystems. Specifically, the logic design analysis (14) determines which types of elementary logic components, e.g., logic gates, flip-flops, etc., are used to construct the subsystems as well as how these components are interconnected. For example, a logic design analysis may specify the interconnection of logic gates and flip-flops that are used by a particular arithmetic unit to perform binary addition.

After the logic design analysis (14), the circuit design analysis (16) is used to generate a circuit schematic (18) of the IC's logic components. The circuit design analysis (16) determines the types, sizes, and interconnections of the logic circuits, e.g., transistors, used to form the logic components for each subsystem. For example, a circuit schematic generated by a circuit design analysis may include the specific configuration, types, and sizes of transistors used to form a flip-flop used in particular input/output device.

Typically, the quality of a circuit simulation tool is measured by an accuracy with which the circuit simulation tool predicts/measures certain circuit behavior, e.g., timing delays, voltage drops, etc. The accuracy of a circuit simulation tool is important because, in many cases, the timing delays measured for a particular voltage drop are used to optimize the size and configuration of on-chip logic components in order to meet and/or exceed predetermined design performance goals, e.g., low power dissipation. For small and/or portable electronic devices, low power dissipation by on-chip logic components ensures that an electronic device does not consume excessive amounts of power and is able to be adequately and cost-effectively cooled.

One manner in which designers optimize the power dissipation of a particular IC is through effective design of the IC's power grid, which is used to provide supply voltage and ground to the logic components of the IC's subsystems. Generally, a power grid is designed as a stack of wire meshes attached to a surface of the IC, wherein each wire mesh is attached to a voltage supply or to ground. Further, at various locations on the IC, each wire mesh is wired to one more logic components so that, ideally, each location on the IC receives sufficient supply voltage to operate correctly.

When logic gates on an integrated circuit transition, the logic gates draw current from or sink current to the power grid. Because the flow of current through the power grid typically causes supply voltage variations, there is a propensity for the behavior of one transitioning logic gate to affect the behavior of another logic gate on the integrated circuit. For example, when a transitioning logic gate sinks/draws a large amount of current to/from the power grid, other logic gates in close proximity to the transitioning logic gate may see a sudden surge/drop in supply voltage. Surges/drops in supply voltage may corrupt the signals outputted by these other logic gates by causing the signals to transition too early or too late, i.e., altering the timing delays of the signals. Consequently, these timing errors may propagate to other parts of the processor, thereby causing timing failures and/or circuit malfunction. Further, sudden surges/drops in supply voltage often increase the amount of power that is dissipated by the IC. For example, voltage surges may introduce excess power into the IC.

Typically, supply voltage variation in the power grid is minimized during the logic design analysis (14) and/or the circuit design analysis (16) of the circuit simulation process. FIG. 2 shows a circuit simulation technique that is used to minimize supply voltage variation during the design of an IC's power grid. First, a voltage drop budget, i.e., a margin of error for supply voltage variation, is set for the integrated circuit (step 20). The voltage drop budget, which is typically set to the worst-case voltage drop seen on the IC, is used to ensure that the IC is designed so that every logic gate on the IC to continuously receive at least the supply voltage necessary for correct operation of the IC. For example, if an IC that expects to see a supply voltage of 1.2 volts is found to have a worst-case voltage drop of 0.2 V at the center the IC, then it is the designer's responsibility to reconfigure and/or resize the IC's logic components so that the IC operates correctly at 1 V.

Referring to FIG. 2, after the IC has been assigned a voltage drop budget, the power grid is designed to meet the voltage drop budget (step 22). Typically, this is accomplished by altering the width and/or length of certain wires in the power grid and/or by altering the number and/or locations of wires connecting the power grid to the IC's logic components. Next, a timing analysis is performed on the IC using the voltage drop budget (step 24). During the timing analysis, the IC's logic components are tested individually and collectively to ensure that each logic component and/or each logic path formed by a set of logic components (1) receives at least the correct supply voltage and (2) meets a set of predefined timing requirements. Any logic components that do not meet the IC's supply voltage requirement and/or predefined timing requirements are redesigned (step 26), i.e., resized or replaced with functionally equivalent logic components that adhere to the design specification.

Note that, although the process shown in FIG. 2 does significantly reduce power dissipation in most IC designs, some of the redesigned logic components may be considerably over-sized to meet the predefined timing requirements. Consequently, this results in a higher power dissipation for the logic components. Thus, some amount of excess power may be re-introduced into the IC design.

SUMMARY OF THE INVENTION

According to one aspect of the present invention, a method for assigning a set of region-based voltage drop budgets to an integrated circuit comprises determining a voltage drop criteria for at least a portion of the integrated circuit; analyzing the at least a portion of the integrated circuit for worst-case voltage drop data using the voltage drop criteria; partitioning the at least a portion of the integrated circuit into a set of voltage drop regions based on the worst-case voltage drop data; and assigning to at least one of the voltage drop regions a region-based voltage drop budget based on a worst-case voltage drop seen by the at least one of the voltage drop regions.

According to another aspect, a method for designing a power grid of an integrated circuit to meet a predefined power dissipation requirement comprises determining a voltage drop criteria for at least a portion of the integrated circuit; analyzing the at least a portion of the integrated circuit for worst-case voltage drop data using the voltage drop criteria; partitioning the at least a portion of the integrated circuit into a set of voltage drop regions based on the worst-case voltage drop data; and assigning to at least one of the voltage drop regions a region-based voltage drop budget based on a worst-case voltage drop seen by the at least one of the voltage drop regions; and designing the power grid to meet the predefined power dissipation requirement using the region-based voltage drop budget.

According to another aspect, a computer system comprises a processor; a memory; and instructions residing in the memory executable in the processor for determining a voltage drop criteria for at least a portion of the integrated circuit; analyzing the at least a portion of the integrated circuit for worst-case voltage drop data using the voltage drop criteria; partitioning the at least a portion of the integrated circuit into a set of voltage drop regions based on the worst-case voltage drop data; and assigning to a voltage drop region a region-based voltage drop budget based on a worst-case voltage drop seen by the voltage drop region.

Other aspects and advantages of the invention will be apparent from the following description and the appended claims.

DETAILED DESCRIPTION

Embodiments of the present invention relate to a method and apparatus for assigning a set of region-based voltage drop budgets to an integrated circuit. Embodiments of the present invention further relate to a method for partitioning an integrated circuit into optimal voltage drop regions. Embodiments of the present invention further relate to a method for optimizing the power dissipation of an integrated circuit.

Figure 1:
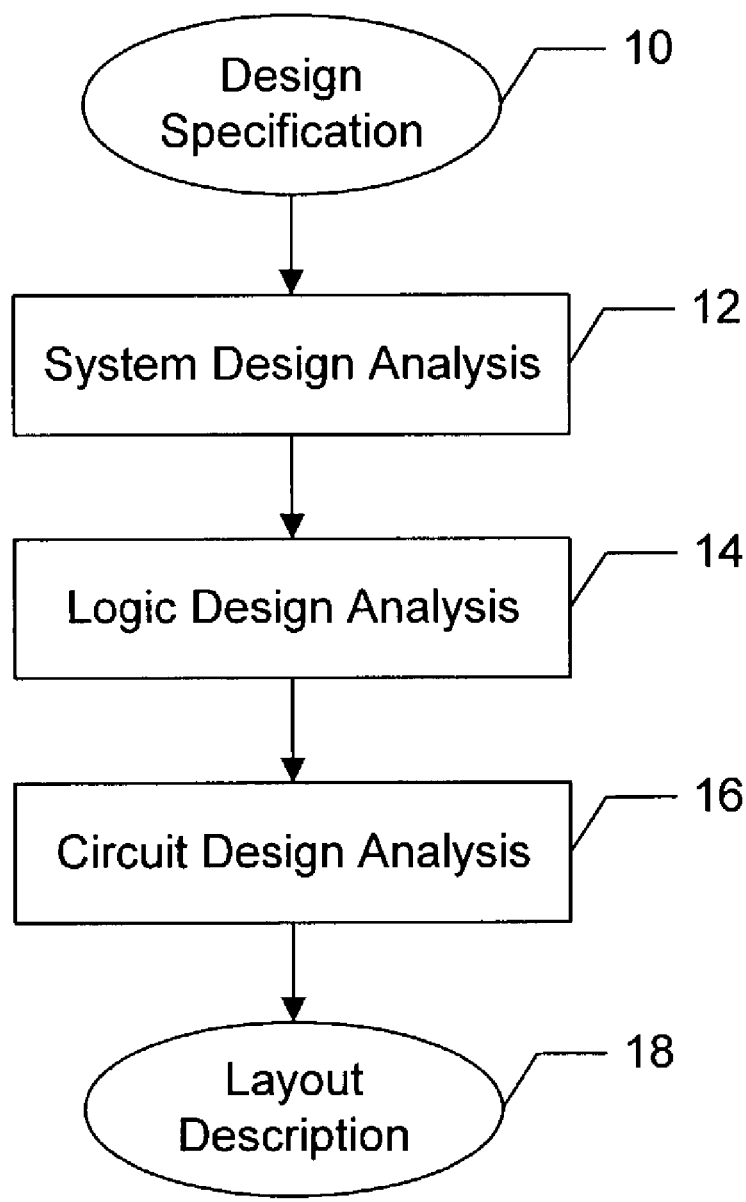
FIG. 1 shows a flow process of a typical circuit simulation process.
Figure 2:
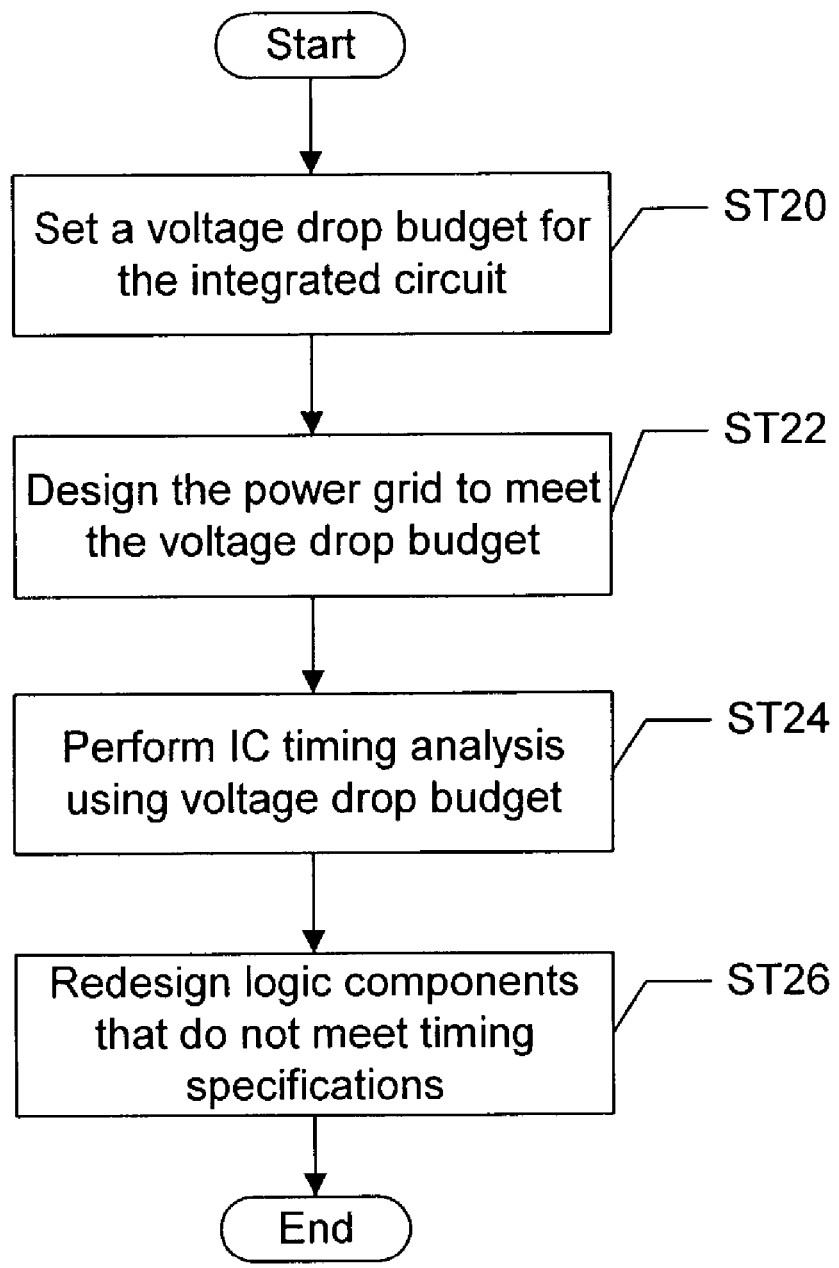
FIG. 2 shows a flow process of a typical power grid design process.
Figure 3:
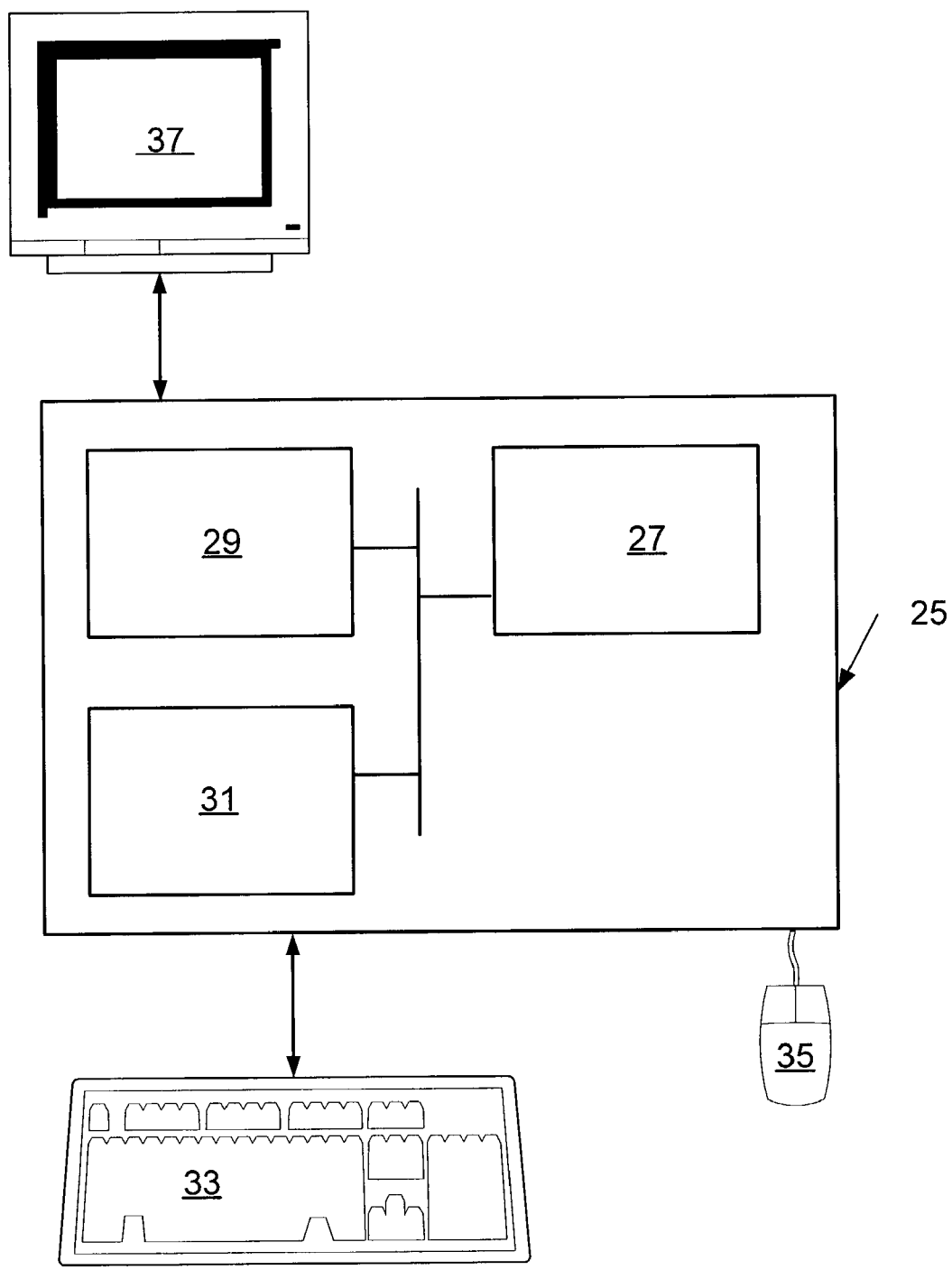
FIG. 3 shows a computer system in accordance with an embodiment of the present invention.

The present invention may be implemented on virtually any type of computer regardless of the platform being used. For example, as shown in FIG. 3, a typical computer (25) includes a processor (27), memory (29), a storage device (31), and numerous other elements and functionalities typical of today's computers (not shown). The computer (25) may also include input means, such as a keyboard (33) and a mouse (35), and output means, such as a monitor (37). Those skilled in the art will appreciate that these input and output means may take other forms in an accessible environment.

In one aspect, the present invention relates to a chip simulation technique in which an integrated circuit is partitioned into a set of voltage drop regions using one or more chip partitioning schemes. For each partitioning scheme, the dimensions, i.e., the size and shape of the voltage drop regions are determined by performing a worst-case voltage drop analysis on the integrated circuit. Once the integrated circuit has been partitioned into voltage drop regions, each voltage drop region is assigned a region-based voltage drop budget using the worst-case voltage drop in the voltage drop region.

Note that, by assigning multiple voltage drop budgets to an integrated circuit, a designer may ensure that each IC location is assigned a voltage drop budget commensurate with the actual voltage drop experienced by the location. In other words, the designer may ensure that a voltage-starved logic component is assigned an appropriate voltage drop budget while also ensuring that a neighboring logic component is not over-sized to meet the same voltage drop budget. For example, if an IC is found to have a much larger voltage drop at the center than at the outer edges, the designer may assign the IC's center and the IC's outer edges different voltage drop budgets. Thus, the IC's logic components may be configured and sized to ensure that logic components at the center of the IC operate correctly given a lower supply voltage, while also ensuring that logic components at the IC's outer edges are not over-sized to meet the lower supply voltage seen at the center of the IC.

FIGS. 4a–4d show four separate partitioning schemes used to partition an integrated circuit into a set of voltage drop regions in accordance with embodiments of the present invention. For each partitioning scheme, a different voltage drop criteria, i.e., a different cause of voltage drop, is used to approximate the worse-case voltage drop at various locations on the IC. The voltage drop criteria and, thus, the type of partitioning scheme, used for a particular IC is dependent on the level of design information available on the IC's floorplan.

Note that, for most IC designs, the level of design information available is determined by the completeness of the circuit simulation process. For example, more complete design information may be available for a first IC that has gone through circuit design analysis than for a second IC that has only gone through logic design analysis. As a result, a more involved voltage drop analysis and, thus, a more advanced partitioning scheme may be used for the first IC than for the second IC.

Figure 4A:
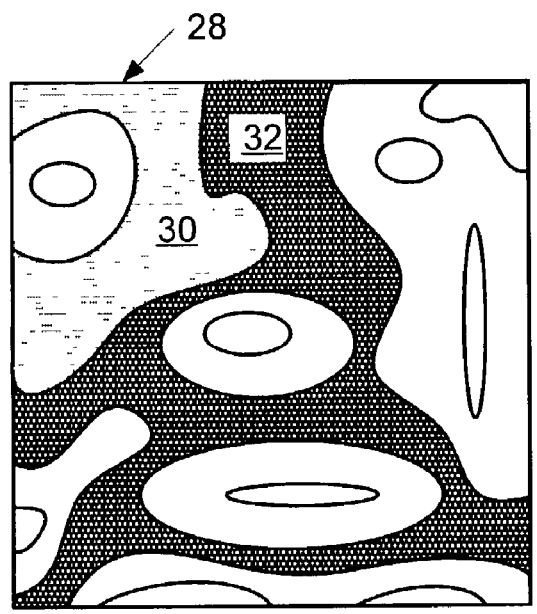
FIGS. 4a–4d show partitioning schemes in accordance with embodiments of the present invention.

Referring to FIG. 4a, an integrated circuit (28) is partitioned into contour-based voltage drop regions, wherein the dimensions of the contour-based regions are based on a full-grid voltage drop analysis of the IC (28). The full-grid voltage drop analysis is used to simulate a worst-case voltage drop model that includes an approximation of the worst-case voltage drop for each location of the IC (28). Two adjacent contour-based voltage drop regions, referred to herein as a first contour-based voltage drop region (30) and a second contour-based voltage drop region (32), are shown as shaded regions in FIG. 4a. The first and second contour-based voltage drop regions (30, 32) each include neighboring logic components and/or gates that are indicated in the worst-case voltage drop model as experiencing similar voltage drop. For example, in one or more embodiments, the first contour-based voltage drop region (30) may include logic components and/or gates that experience a voltage drop of 0.5 to 0.6 volts while the second contour-based voltage drop region (32) may include logic components and/or gates that experience a voltage drop of 0.2 to 0.4 volts.

Figure 4B:
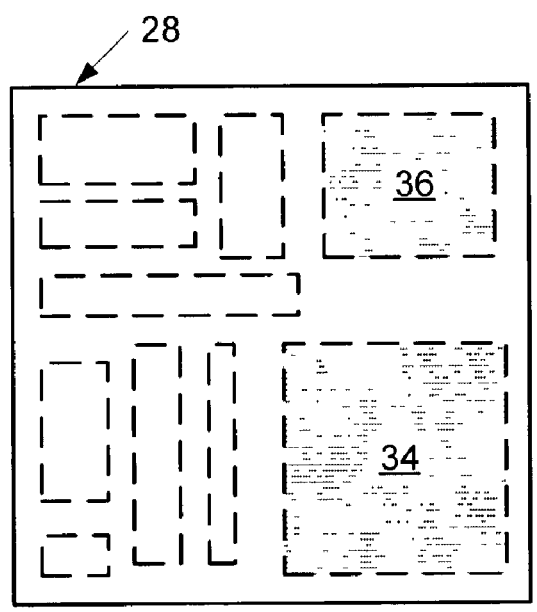

In FIG. 4b, the integrated circuit (28) is partitioned into block-based regions, wherein the dimensions of the block-based voltage drop regions are based on the sizes and locations of the IC's subsystems. Two block-based voltage drop regions, referred to herein as a first block-based voltage drop region (34) and a second block-based voltage drop region (36), are shown as shaded regions in FIG. 4b. The first and second block-based voltage drop regions (34, 36) each include neighboring logic components and/or gates that belong the same subsystem of the IC (28). For example, in one or more embodiments, the first block-based voltage drop region (34) may include logic components and/or gates that form a memory device while the second block-based voltage drop region (36) may include logic components and/or gate that form an input/output device.

Figure 4C:
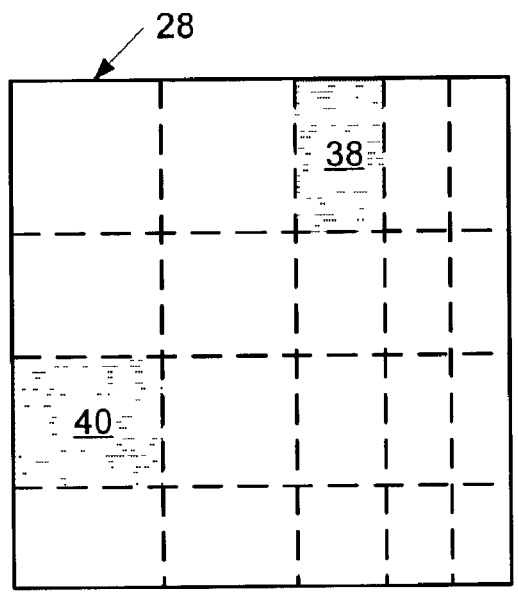

In FIG. 4c, the integrated circuit (28) is partitioned into non-uniformly sized voltage drop regions, wherein the dimensions of the non-uniformly sized voltage drop regions are based on the densities of particular types of logic gates and/or circuits in various locations across the IC (28). Two non-uniformly sized voltage drop regions, referred to herein as a first non-uniformly sized voltage drop region (38) and a second non-uniformly sized voltage drop region (40), are shown as shaded regions in FIG. 4b. The first and second non-uniformly sized voltage drop regions (38, 40) each include a certain number of a particular type of logic gate and/or circuit.

For example, in one or more embodiments, both the first and second non-uniformly sized voltage drop regions (38, 40) may each include 20 decoupling capacitors. Note that, in FIG. 4c, the first non-uniformly sized region (38) is smaller than the second non-uniformly sized region (40). For the example given, this means that, because both voltage drop regions have 20 decoupling capacitors, the first non-uniformly sized voltage drop region (38) has a greater density of decoupling capacitors than the second non-uniformly sized voltage drop region (40).

Figure 4D:
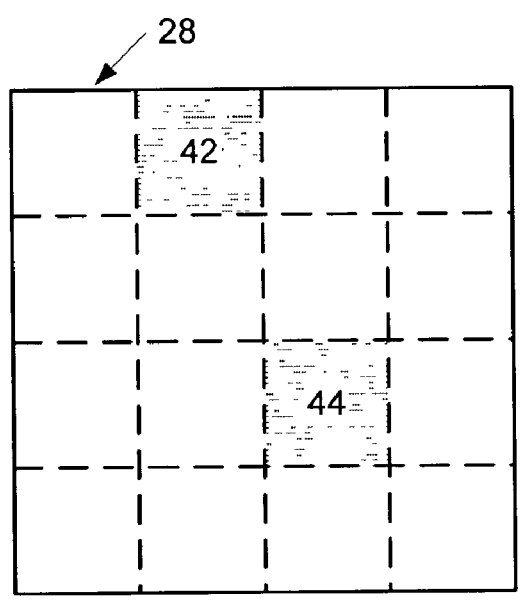

Referring to FIG. 4d, the integrated circuit (28) is partitioned into uniformly sized voltage drop regions, i.e., regions with equal dimensions. In one or more embodiments, the dimensions of the uniformly sized voltage drop regions may be based on an amount of area on the IC's surface and/or on a bump grid pattern of the IC's surface. Two uniformly sized voltage drop regions, referred to herein as a first uniformly sized voltage drop region (42) and a second uniformly sized voltage drop region (44), are shown as shaded regions in FIG. 4b. Note that, although the first and second uniformly size regions are shown as square regions, any dimension may be used that ensures that the voltage drop regions are uniformly sized.

Figure 5:
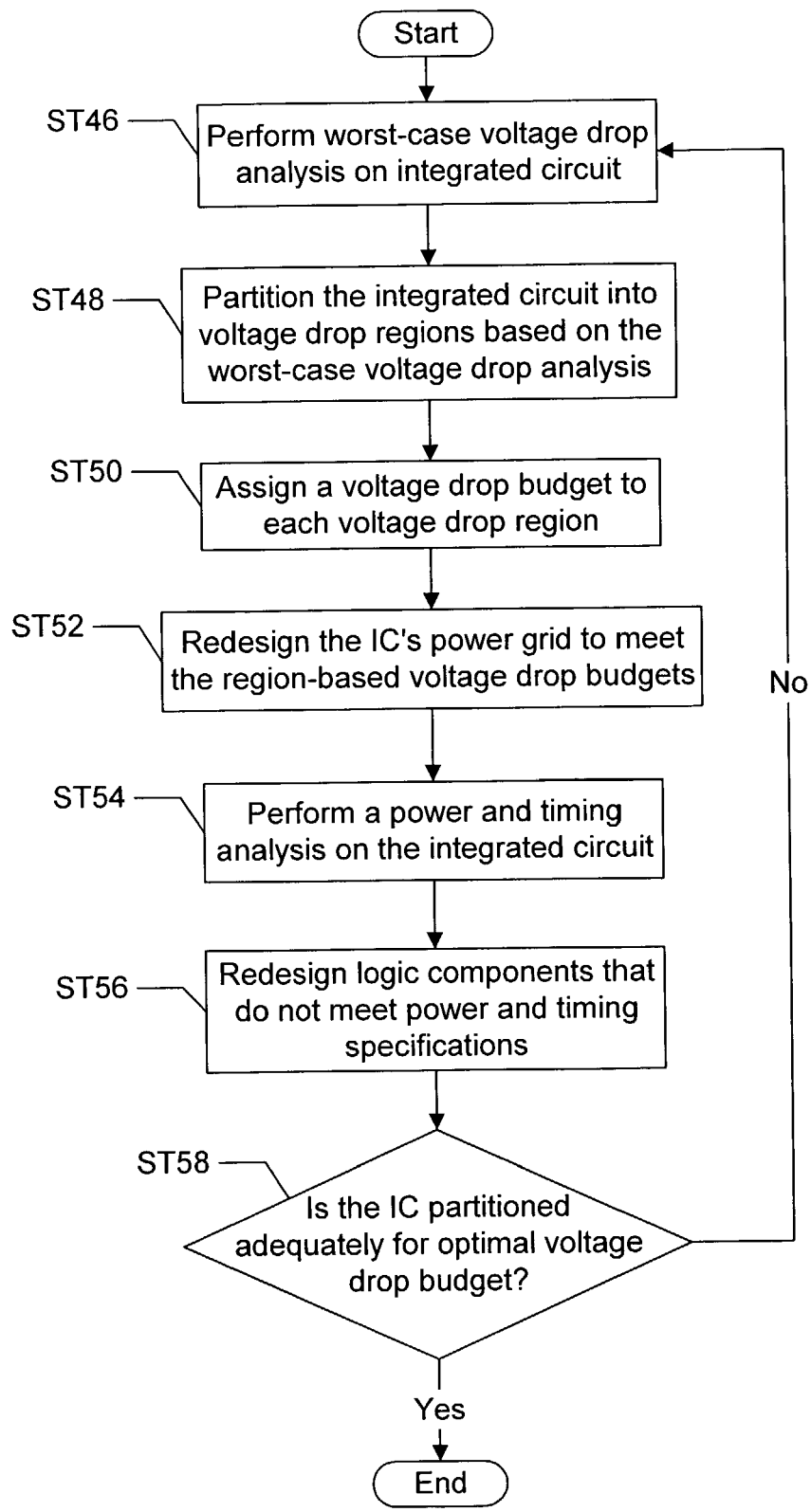
FIG. 5 shows a flow process for partitioning an integrated circuit into voltage drop regions in accordance with an embodiment of the present invention.

FIG. 5 shows a flow process in which one or more of the partitioning schemes shown in FIGS. 4a–4d is used to partition an integrated circuit in accordance with an embodiment of the present invention. Note that, the process shown in FIG. 5 may be performed at any point during a circuit simulation process. Further, the process shown in FIG. 5 may be performed as many times as required to optimize the power dissipation of a particular IC design. Thus, the time spent in IC optimization and the level of optimization performed on a particular IC design are arbitrarily set by a designer and/or the requirements of a design specification.

Referring to FIG. 5, first, a worst-case voltage drop analysis is performed on the integrated circuit (step 46). During the worst-case voltage drop analysis, a voltage drop criteria is used to approximate the worst-case voltage drop at number of locations on the IC. For example, in embodiments where a circuit-level schematic is available for the IC, an extensive worst-case voltage drop analysis may be performed. Thus, worst-case voltage drop data may be obtained for every circuit on the IC by applying a specified supply voltage to the IC's power grid. Thus, the IC may be tested at various locations to determine whether a supply voltage seen at each location is more or less than the specified supply voltage and by what amount.

Next, based on the data obtained from the worst-case voltage drop analysis, the integrated circuit is partitioned into voltage drop regions (step 48). During this step, a partitioning scheme, such as those shown in FIGS. 4a–4d, is used to group neighboring IC locations that experience similar voltage drop into a voltage drop region. Note that the amount of variance in voltage drop experienced by different locations in a single voltage drop region is determined by a designer and/or a design specification.

For example, in an embodiment where the IC is partitioned into contour-based voltage drop regions, the designer and/or design specification may require that all of the locations in a single voltage drop region have worst-case voltage drops that are within 0.1 volts of each other. Thus, in such an embodiment, a single voltage drop location may include neighboring IC locations that have worst-case voltage drops between 0.3 and 0.4 volts.

Once the integrated circuit has been partitioned into voltage drop regions, each voltage drop region is assigned a region-based voltage drop budget based on the worst-case voltage drop for the region (step 50). Thus, for a single voltage drop region, the worst-case voltage drop experienced by a particular location in that voltage drop region is used as its region-based voltage drop budget. Then, using the region-based voltage drop budget, the IC's power grid is redesigned to ensure that each voltage drop region receives the amount of supply voltage specified by the region-based voltage drop budget (step 52).

For example, in an embodiment where a voltage drop region requires a 1.2-volt supply voltage and is assigned a 0.2-volt region-based voltage drop budget, the power grid may be redesigned to ensure that the voltage drop region continuously receives at least 1 volt of supply voltage. In one or more embodiments, the region-based voltage drop budget may be met by increasing the widths of certain power grid wires connected to the voltage drop region; whereas, in other embodiments, the number of connections between the voltage drop region and the power grid may be increased.

Once the power grid has been redesigned, a power and timing analysis is performed on the integrated circuit (step 54). During the power and timing analysis, the IC is tested to ensure that each logic component and/or each logic path meets a set of predefined power dissipation and timing requirements.

For example, in embodiments where a circuit-level schematic is available for the IC, power and timing data may be obtained for circuits on the IC by applying a specified supply voltage to the IC's power grid. Thus, each logic path on the IC may be tested using transitioning input signals to (1) determine whether or not each logic component receives the correct input voltage and to (2) measure how much power is dissipated by various logic circuits. Further, each logic path on the IC may be tested using various input signals to determine whether the input signals are propagated along the logic path in a timely manner, i.e., in accordance with timing requirements set by a designer and/or a design specification. Any logic components and/or logic paths that do not meet the IC's power and/or timing requirements may be resized and/or reconfigured (step 56).

Next, the integrated circuit is analyzed to determine whether the IC is partitioned adequately for optimal voltage drop budget (step 58). Thus, as mentioned before, a designer may ensure that each IC location is assigned a voltage drop budget commensurate with the actual voltage drop experienced by the location. Thus, the designer may ensure that a first logic component receiving a low supply voltage is sized large enough to meet IC timing requirements, while also ensuring that a neighboring logic component receiving a higher supply voltage is not over-sized to meet the voltage drop budget of the first logic component.

If the IC is not partitioned adequately, then the process shown in FIG. 5 is repeated. Thus, (1) some or all of the IC may be completely repartitioned or (2) some or all of the voltage drop regions may be further divided into smaller voltage drop regions.

Those skilled in the art will understand that the techniques presented above to assign region-based voltage drop budgets may be applied to portions of an integrated circuit instead of the IC as a whole.

Advantages of the present invention may include one or more of the following. In one or more embodiments, because an integrated circuit is partitioned into voltage drop regions, a designer may ensure that an IC location is assigned a voltage drop budget commensurate with the actual voltage drop experienced by the location.

In one or more embodiments, because a voltage drop region of an IC is assigned a region-based voltage drop budget based on a worst-case voltage drop seen by the voltage drop region, a designer may ensure that a first on-chip logic component having a large voltage drop operates correctly given a low supply voltage, while also ensuring that a neighboring logic component having a smaller voltage drop is not over-sized to meet the voltage drop budget of the first logic component. Thus, the designer may reduce the IC's power dissipation.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for assigning a set of region-based voltage drop budgets to an integrated circuit, comprising:
    determining a voltage drop criteria for at least a portion of the integrated circuit;
    analyzing the at least a portion of the integrated circuit for worst-case voltage drop data using the voltage drop criteria;
    based on the worst-case voltage data, partitioning the at least a portion of the integrated circuit into at least one of a set of contour-based voltage drop regions, a set of block-based voltage drop regions, a set of non-uniformly sized voltage drop regions, and a set of uniformly-sized voltage drop regions; and
    assigning to at least one of the voltage drop regions a region-based voltage drop budget based on a worst-case voltage drop seen by the at least one of the voltage drop regions.

2. The method of claim 1, wherein dimensions of each of the set of contour-based voltage drop regions are determined by a full-grid worst-case voltage drop analysis of the integrated circuit.

3. The method of claim 1, wherein dimensions of each of the set of block-based voltage drop regions are based on a dimension and a location of a subsystem of the integrated circuit.

4. The method of claim 1, wherein dimensions of each of the set of non-uniformly sized voltage drop regions are based on a density of a particular type of logic component disposed on the integrated circuit.

5. The method of claim 1, wherein dimensions of each of the set of uniformly sized voltage drop regions are based on a bump grid pattern of the integrated circuit.

6. A method for designing a power grid of an integrated circuit, comprising:
    determining a voltage drop criteria for at least a portion of the integrated circuit;
    analyzing the at least a portion of the integrated circuit for worst-case voltage drop data using the voltage drop criteria;
    based on the worst-case voltage drop data, partitioning the at least a portion of the integrated circuit into a set of contour based voltage drop regions, a set of block-based voltage drop regions, a set of non-uniformly sized voltage drop regions, and a set of uniformly-sized voltage drop regions; and
    assigning to at least one of the voltage drop regions a region-based voltage drop budget based on a worst-case voltage drop seen by the at least one of the voltage drop regions; and
    designing the power grid to meet a predefined power dissipation requirement using the region-based voltage drop budget.

7. The method of claim 6, wherein designing the power grid comprises:
    designating a supply voltage for the least one of the voltage drop regions using the region-based voltage drop budget; and
    configuring the power grid to output the supply voltage to the at least one of the voltage drop regions.

8. A computer system, comprising:
    a processor;
    a memory; and
    instructions residing in the memory executable in the processor for
        determining a voltage drop criteria for at least a portion of an integrated circuit;
        analyzing the at least a portion of the integrated circuit for worst-case voltage drop data using the voltage drop criteria;
        based on the worst-case voltage drop data, partitioning the at least a portion of the integrated circuit into at least one of a set of contour-based voltage drop regions, a set of block-based voltage drop regions, a set of non-uniformly sized voltage drop regions, and
a set of uniformly-sized voltage drop regions; and
assigning to a voltage drop region a region-based
voltage drop budget based on a worst-case voltage
drop seen by the voltage drop region.

9. The computer system of claim 8, further comprising instructions for redesigning the power grid to meet the predefined power dissipation requirement using the region-based voltage drop budgets.

10. The computer system of claim 9, wherein the instructions for redesigning the power grid comprise instructions for:
designating a supply voltage for the voltage drop region using the region-based voltage drop budget; and
adapting the power grid to output the supply voltage to the voltage drop region.

* * * * *

UNITED STATES PATENT AND TRADEMARK OFFICE
CERTIFICATE OF CORRECTION

PATENT NO. : 6,976,235 B2  Page 1 of 1
DATED : December 13, 2005
INVENTOR(S) : Sudhakar Bobba et al.

It is certified that error appears in the above-identified patent and that said Letters Patent is hereby corrected as shown below:

<u>Column 8,</u>
Line 34, insert -- at least one of -- after "into".
Line 60, insert -- having a power grid -- after "circuit".

<u>Column 9,</u>
Line 7, replace "redesigning" with -- designing --.
Line 9, replace "budgets" with -- budget --.

<u>Column 10,</u>
Line 2, replace "redesigning" with -- designing --.

Signed and Sealed this

Fourth Day of April, 2006

JON W. DUDAS
*Director of the United States Patent and Trademark Office*